United States Patent Office 2,782,213
Patented Feb. 19, 1957

2,782,213

4,5,21-TRIHYDROXYPREGNANE-3,20-DIONE, 11-OXYGENATED DERIVATIVES AND ESTERS THEREOF

Frank B. Colton, Chicago, Ill., assignor, by mesne assignments, to G. D. Searle & Co., Skokie, Ill., a corporation of Delaware No Drawing. Application June 29, 1954,
Serial No. 440,269

6 Claims. (Cl. 260—397.45)

The present invention relates to a new group of steroids and, more specifically, to 4,5,21-trihydroxy-pregnane-3,20-dione, its 11-oxygenated derivatives and esters thereof. The compounds which constitute my invention can be represented by the general structural formula

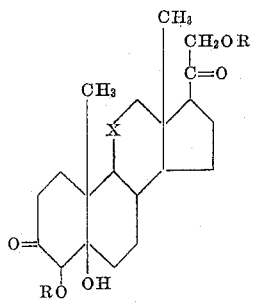

wherein X is a member of the class consisting of methylene, carbinol and carbonyl radicals and R is a member of the class consisting of hydrogen and lower hydrocarbon carboxylic acid residues. Among the radicals which R can represent are hydrogen and such lower alkanoyl radicals as formyl, acetyl, propionyl, butyryl, valeryl, hexanoyl, cyclopentanepropionyl, cyclohexaneacetyl, and the like. Also within the scope of my invention are compounds wherein R represents a benzoyl, toluyl or related aromatic acyl radical.

The compounds of my invention are conveniently prepared from corticosterone, 11-desoxycorticosterone, 11-dehydrocorticosterone or their esters by treatment with osmium tetroxide and hydrogen peroxide in an inert anhydrous organic solvent. There results the formation of the corresponding 4,5-dihydroxypregnane derivative. Treatment of a 4,5-dihydroxy-, 4,5,11β-trihydroxy-, 4,5-dihydroxy-11-oxo-, 4,5,21-trihydroxy-, 4,5,21-trihydroxy-11-oxo-, or 4,5,11β,21-tetrahydroxy derivative of pregnane-3,20-dione with an acylating agent such as an acyl halide or acyl anhydride in pyridine at room temperature causes selective acylation of the hydroxyl groups in the 4- and 21-positions, the hydroxyl groups in the 5- and 11β-position remaining unaffected. If an 11α-hydroxy group is substituted for the 11β-hydroxy group, the 11α-acyloxy derivative can also be formed in preference to esterification in the 5-position.

The compounds have valuable pharmacological properties. They are useful in the treatment of inflammatory conditions, especially of the eye, and are superior to the naturally occurring adrenocorticoid hormones in that they lack some of the side reactions which limit the therapeutic applicability of these hormones. In addition, they have a depressor activity. It is particularly interesting to note that 4,21-diacetoxy-5-hydroxy-pregnane-3,20-dione antagonizes the pressor effect of the steroid from which it is derived, desoxycorticosterone acetate. The compounds of my invention are also valuable as intermediates in organic synthesis. Thus heating of the 4,5-dihydroxy compounds with glacial acetic acid and a small amount of p-toluenesulfonic acid yields the 4-hydroxy-4-pregnenes of the structural formula

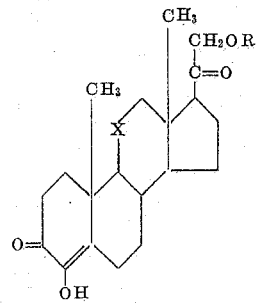

which act as desoxycorticosterone antagonists. The same 4-hydroxypregnene compounds are also obtained under the same conditions from the corresponding 4-acetoxy-5-hydroxy compounds; in this process one molecule of acetic acid is eliminated. An alternative procedure for the synthesis of these 4-hydroxypregnenes from the 4-acyloxy-5-hydroxy and 4,5-dihydroxypregnanes of my invention comprises heating of these steroids at reflux temperature for a few minutes with concentrated hydrochloric acid in methanol.

I have found that dehydration of the new 4-acyloxy-5-hydroxysteroids with thionyl chloride in pyridine at 0° C. results in the formation of 5-pregnenes of the structural formula

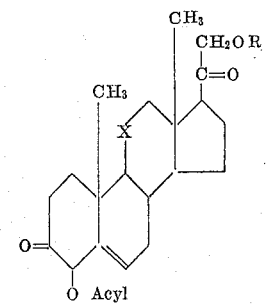

On treatment of these 5-pregnenes in acetic acid solution with one equivalent of hydrochloric acid at room temperature for 30 minutes the corresponding 4-pregnenes of the structural formula

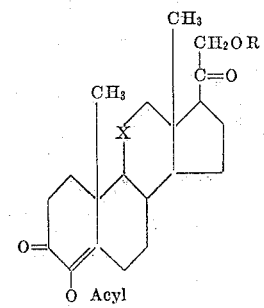

are formed.

My invention will appear in further detail from the following examples. However, my invention is not to be construed as limited by the details set forth therein. In these examples quantities are indicated as parts by weight.

Example 1

To a mixture of 10.5 parts of desoxycorticosterone acetate in 360 parts of anhydrous ether are added a solution of 0.41 part of osmium tetroxide in 18 parts of anhydrous ether and then 16 parts of a 3.6-N hydrogen peroxide solution in tertiary butanol. The reaction mixture is permitted to stand for 3 hours and is then treated with 4 more parts of such a 3.6-N hydrogen peroxide solution. After standing at room temperature for 94 hours, the reaction mixture is treated with 350 parts of ether, washed with saturated sodium bisulfite solution and then with saturated sodium chloride solution, dried over anhydrous sodium sulfate, filtered and then concentrated to a residue of about 350 parts. A precipitate forms which is collected on a filter. An additional yield is obtained by concentration of the mother liquor and cooling. The residue is vacuum dried. The ultraviolet absorption spectrum of the 4,5-dihydroxy-21-acetoxy-pregnane-3,20-dione thus obtained shows no maximum in the region of 240 millimicrons.

A mixture of 2 parts of this steroid with 25 parts of pyridine and 25 parts of acetic anhydride is maintained at room temperature for 6 hours, then treated with ice and permitted to stand at 0° C. for 10 hours. The precipitate is collected on a filter and washed with water. 4.5 parts of the crude product thus obtained are dissolved in a 5% solution of ethyl acetate in benzene and then applied to a chromatography column containing 400 parts of silica gel. The column is first washed with 1800 parts each of a 5% solution of ethyl acetate in benzene and a 10% solution of ethyl acetate in benzene, and then with 3600 parts of a 15% solution of ethyl acetate in benzene. Subsequent elution with 15% ethyl acetate in benzene and concentration of the eluate yields 4,21-diacetoxy-5-hydroxypregnane-3,20-dione which, crystallized from a mixture of ethyl acetate and cyclohexane, melts at about 247–249° C. The optical rotation of a 1% chloroform solution $\alpha_D^{25}$ is 72°. Infrared maxima are observed at 2.97, 5.73, 5.80, 7.29, 7.83, 8.12, 9.31, 9.50, 11.0, and 11.34 microns. The compound has the structural formula

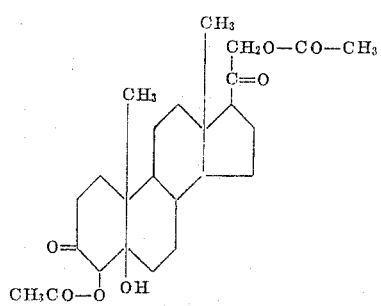

To a solution of 1 part of 4,5-dihydroxy-21-acetoxy-pregnane-3,20-dione in 25 parts of methanol is added slowly one equivalent of 0.1-N aqueous sodium hydroxide. The solution is maintained at room temperature for 30 minutes and then diluted with water and extracted with ethyl acetate. The extract is washed with concentrated aqueous sodium chloride, dried over sodium sulfate, filtered and evaporated. The residue contains a mixture of 4,5,21 - trihydroxypregnane-3,20-dione and 4,21-dihydroxy-4-pregnene-3,20-dione. The mixture is applied to a silica gel chromatography column. The column is washed with benzene and then with benzene solutions containing increasing proportions of ethyl acetate in benzene. A 15% solution of ethyl acetate in benzene first elutes 4,21-dihydroxy-4-pregnene-3,20-dione and then 4,5,21-trihydroxypregnane-3,20-dione. This compound shows no ultraviolet absorption near 240 millimicrons. An infrared maximum is observed at 2.8 microns and a broad peak at 5.7–5.8 microns. The compound has the structural formula

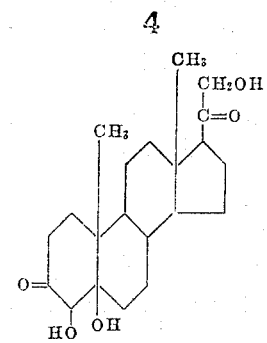

Example 3

A mixture of 12 parts of corticosterone propionate and 900 parts of tertiary butanol is treated first with a solution of 1.2 parts of osmium tetroxide in 51 parts of tertiary butanol and then, in the course of 10 minutes, with 2 portions of 15.2 parts of a 3-N solution of hydrogen peroxide in tertiary butanol. The reaction mixture is permitted to stand at room temperature for a week and is then concentrated to about one-third of its original volume and extracted with ethyl acetate. The extract is washed successively with water, sodium bisulfite and saturated sodium chloride solution, dried over anhydrous calcium sulfate, filtered and evaporated to dryness under vacuum. 10 parts of the residue, containing 4,5,11β-trihydroxy-21-propionoxy-pregnane-3,20-dione are mixed with 150 parts of pypridine and 100 parts of propionic anhydride and the reaction mixture is maintained at room temperature for 15 hours, then ice is added and, after standing for 6 hours, the precipitate is collected on a filter and dried. It is then applied to a chromatography column containing 1000 parts of silica gel. The column is washed with benzene and then with solutions of ethyl acetate in benene containing increasing proportions of ethyl acetate. A 20% solution of ethyl acetate in benzene elutes 4,21-dipropionoxy-5,11β-dihydroxypregnane-3,20-dione. The compound shows no ultraviolet absorption in the region of 240 millimicrons. The infrared absorption spectrum shows maxima at 2.8, 5.73, 5.80, and 8.1 microns. The compound has the structural formula

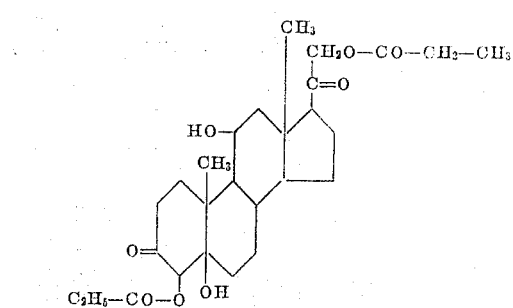

On hydrolysis by the method of Example 2 one obtains 4,5,11β,21-tetrahydroxypregnane-3,20-dione.

Example 4

To a stirred mixture of 2 parts of 11-dehydrocorticosterone and 200 parts of tertiary pentanol are added 0.24 part of osmium tetroxide in 10 parts of tertiary pentanol and then, in the course of 12 minutes, two portions of 3 parts of a 3.05-N solution of hydrogen peroxide in tertiary pentanol. After standing at room temperature for a week, the reaction mixture is concentrated to 30% of its original volume and extracted with ethyl acetate. The extract is washed with water, sodium bisulfite and saturated sodium chloride solution, dried over anhydrous sodium sulfate, filtered and reduced to dryness under vacuum to yield a residue containing 4,5,21-trihydroxy-pregnane-3,11,20-trione.

A mixture of 2 parts of this residue, 30 parts of pyridine and 18 parts of acetic anhydride is maintained at 25° C. for 12 hours and then poured on ice. After 4 hours of standing the precipitate is collected on a filter, dried, dissolved in a 5% solution of ethyl acetate in benzene and thus applied to a chromatography column containing 200 parts of silica gel. The column is eluted with benzene and then with benzene solutions containing increasing proportions of ethyl acetate. A 20% solution of ethyl acetate in benzene elutes a product which, on evaporation and crystallization from ethyl acetate and cyclohexane, forms fine white needles. The ultraviolet absorption spectrum shows no absorption in the region of 240 millimicrons. Infrared maxima are observed at 2.79, 5.7, 5.8, and 8.1 microns. The 4,21-diacetoxy-5-hydroxypregnane-3,11,20-trione thus obtained has the structural formula

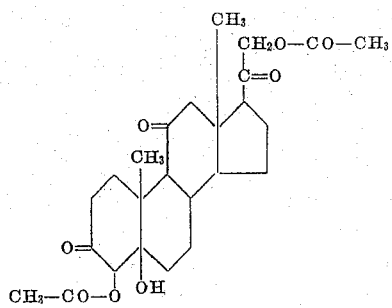

Example 5

To a solution of 2 parts of 4,21-diacetoxy-5-hydroxypregnane-3,20-dione in 210 parts of glacial acetic acid is added 1 part of p-toluenesulfonic acid and the reaction mixture is heated for 19 hours at 70° C. Then ice is added and the precipitate is collected on a filter, washed with water and taken up in ethyl acetate. After charcoal decolorization the ethyl acetate solution is evaporated and the residue is treated with low boiling petroleum ether. Recrystallized from aqueous methanol, the 4-hydroxy-11-desoxycorticosterone acetate thus obtained melts at about 241–242° C. The ultraviolet absorption spectrum shows a maximum at 278 millimicrons with a molecular extinction coefficient of 12,300.

Example 6

A mixture of 3.54 parts of 17-hydroxydesoxycorticosterone acetate and 280 parts of tertiary butanol is treated successively with a solution of 0.38 part of osmium tetroxide in 16 parts of tertiary butanol, 4 parts of a 3.61-N hydrogen peroxide solution in tertiary butanol and, after 10 minutes, with 4 additional parts of such a hydrogen peroxide solution. The reaction mixture is permitted to stand for 7 days, then concentrated to about one-half of its original volume and extracted with ethyl acetate. The extract is washed with water, sodium bisulfite and saturated sodium chloride solution, dried over anhydrous sodium sulfate, concentrated under vacuum to a residue of 100 parts and finally taken to dryness on a steam bath in a current of nitrogen. The residue is dried under vacuum.

3.76 parts of 4,5,17-trihydroxy-21-acetoxypregnane-3,20-dione thus obtained are treated with 50 parts of pyridine and 27 parts of acetic anhydride at room temperature for 15 hours. Then ice is added and the reaction mixture is permitted to stand at room temperature for 6 hours. The resulting precipitate is collected on a filter, vacuum dried and then applied in a 10% solution of ethyl acetate in benzene to a chromatography column containing 320 parts of silica gel. The column is washed with 1800 parts of a 10% solution of ethyl acetate in benzene and then with 10,000 parts of 15% ethyl acetate in benzene. The column is next eluted with a 20% solution of ethyl acetate in benzene. Evaporation of the eluate and successive recrystallizations from a mixture of ethyl acetate and petroleum ether and from aqueous ethanol yields 4,21-diacetoxy-5,17-dihydroxypregnane-3,20-dione which melts at about 262–264° C. with decomposition. The infrared absorption spectrum shows maxima at about 2.89, 5.92, 6.0, 7.29, 8.08, and 9.58 microns.

Example 7

A mixture of 10 parts of cortisone acetate and 500 parts of peroxide-free dioxane is treated successively with a solution of 0.97 part of osmium tetroxide in 150 parts of dioxane and 40 parts of a 3.6-N hydrogen peroxide solution in anhydrous tertiary butanol. The reaction mixture is permitted to stand at room temperature for 10 days and then treated with water and extracted with ethyl acetate. The extract is washed with saturated aqueous sodium bisulfite solution and then with saturated sodium chloride solution. The solvent is concentrated in vacuo to 100 parts and then diluted with ether. A precipitate containing cortisone acetate is removed by filtration and the residue, containing 4,5,17-trihydroxy-21-acetoxypregnane-3,11,20-trione, is concentrated and then mixed at room temperature with 25 parts of pyridine and 25 parts of acetic anhydride. In order to effect complete solution the mixture is warmed for a few minutes on a steam bath. After standing at room temperature for 1 hour, the reaction mixture is treated with ice. The precipitate is collected on a filter and thoroughly washed with water. It is taken up in a 5% solution of ethyl acetate in benzene and applied to a silica gel chromatography column. The column is washed with benzene, a 5% and a 10% solution of ethyl acetate in benzene and then eluted with a 20% solution of ethyl acetate in benzene. Concentration of this eluate and recrystallization of the residue from ethyl acetate and petroleum ether yields 4,21-diacetoxy-5,17-dihydroxypregnane-3,11,20-trione melting at about 257–259° C. (with decomposition). The infrared absorption spectrum shows maxima at 2.90, 7.28, 8.08, 9.52 and 10.21 microns, and a broad band at 5.7–5.85 microns. The optical rotation of an 0.5% chloroform solution is $\alpha_D^{25} = +70°$.

Example 8

To a stirred mixture of 5 parts of 17-hydroxycorticosterone acetate and 250 parts of peroxide-free dioxane, there are added successively a solution of 0.48 part of osmium tetroxide in 75 parts of dioxane and 20 parts of a 3.6-N hydrogen peroxide solution in anhydrous tertiary butanol. After standing at room temperature for a week, the reaction mixture is treated with water and extracted with ethyl acetate. The extract is washed successively with saturated aqueous sodium bisulfate solution and then with saturated aqueous sodium chloride solution. The solvent is removed under vacuum. The resulting residue contains 4,5,11,17-tetrahydroxy-21-acetoxypregnane-3,20-dione as well as some unconverted starting material. This residue is stirred with 15 parts each of pyridine and acetic anhydride at room temperature for 30 minutes and then treated with ice. A precipitate forms which is collected on a filter, washed with water, and is then taken up in a solution of 10% ethyl acetate in benzene and thus applied to a silica gel chromatography column. The column is washed with benzene, 5 and 10% solutions of ethyl acetate in benzene, and then eluted with a 20% solution of ethyl acetate in benzene. Concentration of this eluate and recrystallization of the residue from a mixture of ethyl acetate and petroleum ether yields 4,21-diacetoxy-5,11β,17-trihydroxypregnane-3,20-dione. The ultraviolet absorption shows no maximum in the region of 220 to 250 millimicrons. Infrared maxima are observed at 2.9, broad maxima at 5.7–5.9, and 8.1 microns.

Example 9

A stirred solution of 10.6 parts of 3-methoxy-13-methyl - 1,4,6,7,8,9,11,12,13,14,16,17 - dodecahydro-15H-cyclopenta[a]phenanthren-7-one (prepared by the process described in my U. S. Patent No. 2,655,518, issued October 13, 1953) in 700 parts of anhydrous ether and 45 parts of dry toluene is cooled to 0° C. and saturated with dry acetylene. While a slow stream of acetylene is passed through the reaction mixture, a solution of 20 parts of potassium t-amylate in 135 parts of anhydrous pentanol is added in the course of 15 minutes with stirring. Passage of acetylene and stirring are continued for an additional 4½ hours. After standing at 0° C. for 16 hours, the mixture is washed with aqueous ammonium chloride solution until the aqueous phase is neutral, then with water and saturated sodium chloride solution. The organic layer is dried over anhydrous sodium sulfate, filtered and concentrated under vacuum to a residue of about 250 parts. 500 parts of petroleum ether are added and, after standing at 0° C. for an hour, the mixture is filtered. The collected precipitate is recrystallized from ether. The resulting 3-methoxy-13-methyl - 17 - ethynyl - 1,4,6,7,8,9,11,12,13,14,16,17 - dodecahydro-15H-cyclopenta[a]phenanthren-17-ol melts at about 181–182° C. The rotation as determined in a 1% chloroform solution is $[\alpha]_D = +65°$. An additional amount of this product can be obtained from the mother liquors by concentration under vacuum followed by addition of petroleum ether.

To a refluxing solution of 47.5 parts of 3-methoxy-13 - methyl - 17 - ethynyl - 1,4,6,7,8,9,11,12,13,14,16,17-dodecahydro - 15H - cyclopenta[a]phenanthren - 17 - ol in 3200 parts of methanol and 1000 parts of water are added 240 parts of concentrated hydrochloric acid. Refluxing is continued for an additional 5 minutes after which the solution is maintained at room temperature for 15 minutes. Then 13,000 parts of water are added and the mixture is cooled to 0° C. After standing for several hours at that temperature, the mixture is filtered and the precipitate is dried and crystallized from ethyl acetate. The 13-methyl-17-ethynyl-17-hydroxy-1,2,3,6,7,8,9,10,11,12,13,14,16,17 - tetrahydro - 15H - cyclopenta[a]phenanthren-3-one thus obtained melts at about 202–204° C. The rotation, as determined in a 1% chloroform solution, is $[\alpha]_D = -22.5°$. The ultraviolet absorption spectrum of a methanolic solution shows a maximum at 241 millimicrons with a molecular extinction coefficient of 17,100.

A solution of 53.7 parts of 13-methyl-17-ethynyl-17-hydroxy - 1,2,3,6,7,8,9,10,11,12,13,14,16,17 - tetradecahydro-15H-cyclopental[a]phenanthren-3-one in 1500 parts of dioxane and 1000 parts of pyridine is reduced in an atmosphere of hydrogen over 30 parts of a catalyst containing 5% palladium on calcium carbonate. On absorption of one molecule of hydrogen the reduction is stopped and the mixture is filtered. The filtrate is concentrated under vacuum to about 500 parts, diluted with 3000 parts of ether and washed with normal hydrochloric acid until a Congo red test shows an acidic reaction. The solution is washed successively with water, 5% sodium bicarbonate, water and saturated sodium chloride solution. The ether extract is dried over sodium sulfate, concentrated on the steam bath to about 500 parts and diluted with 800 parts of petroleum ether. After storage at 0° C. for 16 hours, the product is collected on a filter, dried and crystallized from a mixture of ethyl acetate and petroleum ether. The 13-methyl-17-vinyl-17 - hydroxy - 1,2,3,6,7,8,9,10,11,12,13,14,16,17 - tetradecahydro-15H-cyclopenta[a]phenanthren-3-one thus obtained melts at about 169–171° C. The rotation of an alcoholic solution is $[\alpha]_D = +36°$.

A solution of 47.3 parts of phosphorus tribromide in 645 parts of anhydrous ethanol-free chloroform is added dropwise to a solution of 142.9 parts of 13-methyl-17-vinyl - 17 - hydroxy - 1,2,3,6,7,8,9,10,11,12,13,14,16,17- tetradecahydro - 15H - cyclopenta[a]phenanthren - 3 - one in 2250 parts of chloroform and 10 parts of pyridine, maintained at —20° C. After standing at room temperature for 16 hours, the mixture is treated with chloroform and then successively with dilute hydrochloric acid, dilute sodium bicarbonate solution and finally with water. After drying over anhydrous sodium sulfate, the chloroform is stripped off, leaving as a residue the 17-(β-bromoethylidene) - 13 - methyl - 1,2,3,6,7,8,9,10,11,12, 13,14,16,17 - tetradecahydro - 15H - cyclopenta[a]phenanthren-3-one.

45 parts of 17 - (β - bromoethylidene) - 13 - methyl - 1,2,3,6,7,8,9,10,11,12,13,14,16,17 - tetradecahydro - 15H - cyclopenta[a]phenanthren - 3 - one are treated with 400 parts of freshly fused potassium acetate and refluxed for 5 hours in 3200 parts of dry acetone. After cooling the precipitate is removed by filtration and the acetone is distilled in vacuum under nitrogen. The residue is extracted by refluxing with boiling petroleum ether and, after stripping of the solvent in vacuo, the residue is chromatographed over 4500 parts of silica gel. Elution with a 3% solution of ethyl acetate in benzene, evaporation of the solvent from the eluate and crystallization of the residue from aqueous acetone and petroleum ether yields 13 - methyl - 17 - vinyl-1,2,3,6,7,8,9,10,11,12,13,14-dodecahydro - 15H - cyclopenta[a]phenanthren - 3 - one, melting at about 100–101° C. The specific rotation of an 0.66% chloroform solution is $[\alpha]_D = +110.5°$. The ultraviolet absorption spectrum of a methanolic solution shows a maximum at 237 millimicrons with a molecular extinction coefficient of 30,200.

Elution of the chromatography column with a 10% solution of ethyl acetate in benzene, evaporation of the solvent from the eluate and recrystallization of the residue from aqueous acetone yields the 17 - (β - acetoxy - ethylidene) - 13 - methyl - 1,2,3,6,7,8,9,10,11,12,13,14, 16,17 - tetradecahydro - 15H - cyclopenta[a]phenanthren-3-one. This compound is obtained in two polymorphic crystalline forms, one melting at 49–50° C., the other melting at about 96–97° C. The specific rotation of a 1% chloroform solution is $[\alpha]_D = +62.5°$. The ultraviolet absorption spectrum of a methanolic solution shows a maximum at 241 millimicrons with a molecular extinction coefficient of 17,800.

To a solution of 25 parts of 17-(β-acetoxy-ethylidene)-13-methyl - 1,2,3,6,7,8,9,10,11,12,13,14,16,17 - tetradeca - hydro - 15H - cyclopenta[a]phenanthren - 3 - one in 200 parts of tertiary butanol are added 0.27 part of osmium tetroxide in 16 parts of tertiary butanol, followed immediately by 60 parts of a 3.27-N hydrogen peroxide solution in tertiary butanol. In the course of the following two hours, a solution of 1.25 parts of osmium tetroxide in 80 parts of tertiary butanol is added. After standing at room temperature for 24 hours, the mixture is treated with 1500 parts of water and concentrated in vacuum at room temperature until about 320 parts of distillate have been collected. The residue is extracted with ethyl acetate and the extract is washed with water, dried over sodium sulfate, filtered, and evaporated to dryness. The residue is taken up in 1000 parts of methanol and refluxed for 30 minutes with a solution of 9 parts of sodium sulfite in 200 parts of water. The reaction mixture is concentrated to about one-half of its original volume under nitrogen and extracted with ethyl acetate. This extract is washed with water, dried over sodium sulfate and evaporated. The residue contains a mixture of 13 - methyl - 17 - glycolyl - 17 - hydroxy - 1,2,3,6,7,8,9,10,11,12,13,14,16,17 - tetradecahydro - 15H - cyclopenta[a]phenanthren - 3 - one and 17 - (α,β - di - hydroxyethyl) - 17 - hydroxy - 13 - methyl - 1,2,3,6,7,8,9, 10,11,12,13,14,16,17 - tetradecahydro - 15H - cyclopenta - [a]phenanthrene - 3 - one.

In addition the mixture contains a third compound which is the 4,5 - dihydroxy - 13 - methyl - 17 - (β - hy - droxyethylidene)perhydro - 15H - cyclopenta[a]phenanthren - 3 - one.

The above residue is dissolved in 35 parts of pyridine and 35 parts of acetic anhydride and kept at room temperature for 15 hours. Ice and, 2 hours later, water is added and the mixture is extracted with ethyl acetate. This extract is washed with dilute hydrochloric acid, sodium bicarbonate and water. After drying over sodium sulfate, the extract is evaporated under vacuum and the residue is chromatographed over 550 parts of silica gel. The column is eluted first with 1500 parts of a 10% solution of ethyl acetate in benzene. Elution with 500 parts each of a 10% and a 15% solution of ethyl acetate in benzene yields unreacted starting material. The column is next washed with an additional 500 parts of a 15% solution of ethyl acetate in benzene. Elution with a further 500-part portion of such a 15% solution and evaporation of the solvent yields a residue which, when crystallized from a mixture of ethyl acetate and petroleum ether and then from ether, forms crystals melting at about 185–187° C. This material gives a positive blue tetrazolium test and does not have a specific absorption in the ultraviolet spectrum between 220 and 330 millimicrons. The infrared spectrum shows maxima at about 2.78, 5.78, 6.9, 7.3, 8.06, 8.79, 9.21, 9.5, 9.75, 10.3, 10.55, 10.8 and 11.3 microns. The compound is the 4-acetoxy-5-hydroxy - 13 - methyl - 17 - ($\beta$ - acetoxyethylidene)perhydro - 15H - cyclopenta[a]phenanthren - 3 - one of the structural formula

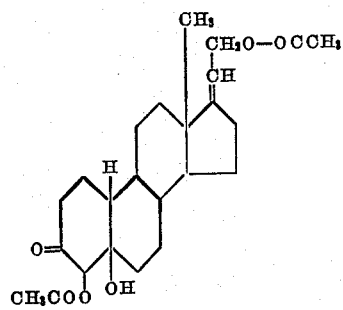

*Example 10*

To a solution of 10 parts of 4-acetoxy-5-hydroxy-13-methyl - 17 - ($\beta$ - acetoxyethylidene)perhydro-15H-cyclopenta[a]phenanthren-3-one in 75 parts of tertiary butanol are added 0.9 part of osmium tetroxide in 5.3 parts of tertiary butanol followed immediately by 20 parts of a 3.27-N hydrogen peroxide solution in tertiary butanol. A solution of 0.41 part of osmium tetroxide in 26 parts of tertiary butanol is added during the entire reaction time. The reaction mixture is exposed to an efficient source of ultraviolet light. After 24 hours of standing at room temperature 500 parts of water are added and the reaction mixture is concentrated in vacuum until about 100 parts of the distillate have been collected. The residue is extracted with ethyl acetate and the extract is washed with water, dried over anhydrous calcium sulfate, filtered and evaporated to dryness. The residue is taken up in 400 parts of methanol and refluxed for 30 minutes with a solution of 3 parts of sodium sulfite in 80 parts of water. Concentration of the reaction mixture to about one-half of its original volume under nitrogen is followed by extraction with ethyl acetate. This extract is washed with water, dried over anhydrous calcium sulfate and evaporated. The residue contains a mixture of 4-acetoxy-5,17-dihydroxy-13-methyl-17-glycolylperhydro-15H-cyclopenta[a]phenanthren-3-one as well as some 4-acetoxy-5,17-dihydroxy-13-methyl-17-($\alpha,\beta$ - dihydroxyethyl)-15H-cyclopenta[a]phenanthren-3-one.

I claim:
1. A compound of the structural formula

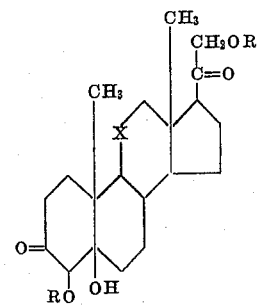

wherein X is a member of the class consisting of methylene, carbinol and carbonyl radicals and R is a member of the class consisting of hydrogen and (lower alkyl)-CO- radicals.

2. A compound of the structural formula

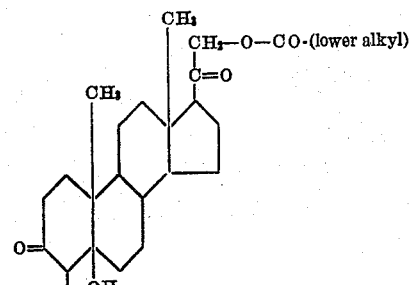

3. 4,5,21-trihydroxypregnane-3,20-dione.
4. A compound of the strutctural formula

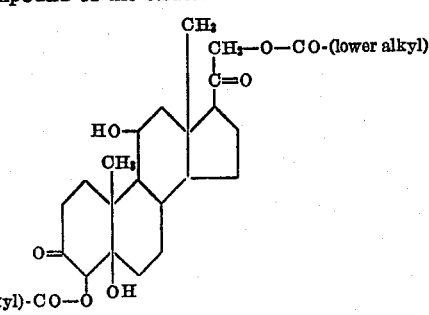

5. 4,5,11$\beta$,21-tetrahydroxypregnane-3,20-dione.
6. A compound of the structural formula

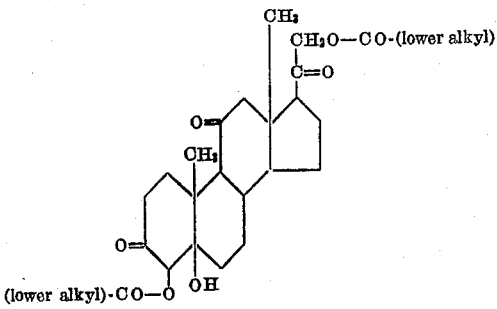

References Cited in the file of this patent
UNITED STATES PATENTS 2,341,081    Butenandt _____ Feb. 8, 1944

FOREIGN PATENTS 497,394    Great Britain _____ Dec. 15, 1938